United States Patent [19]

Moore

[11] 3,867,514
[45] Feb. 18, 1975

[54] RECOVERY OF SULFUR VALUES FROM MOLTEN SALT

[75] Inventor: Keith A. Moore, Staten Island, N.Y.

[73] Assignee: Rockwell International Corporation, El Segundo, Calif.

[22] Filed: May 16, 1973

[21] Appl. No.: 360,987

[52] U.S. Cl................. 423/563, 423/209, 423/428
[51] Int. Cl............................................. C01b 17/16
[58] Field of Search ......... 423/563, 428, 209, 210.5

[56] References Cited
UNITED STATES PATENTS

| | | | |
|---|---|---|---|
| 3,401,010 | 9/1968 | Guerrieri | 423/428 |
| 3,438,727 | 4/1969 | Heredy | 423/563 |
| 3,438,728 | 4/1969 | Grantham | 423/563 |
| 3,574,543 | 4/1971 | Heredy | 423/563 |
| 3,574,545 | 4/1971 | Grantham | 423/563 |

*Primary Examiner*—G. O. Peters
*Attorney, Agent, or Firm*—L. Lee Humphries; Henry Kolin; Clark E. DeLarvin

[57] ABSTRACT

A process for recovering sulfur values from a molten salt containing alkali metal sulfides by treating the sulfide-containing molten salt with a gaseous mixture containing carbon dioxide and steam at a temperature below 600°C to form alkali metal carbonates in the molten salt and hydrogen sulfide, the steam for the reaction being provided by injecting water directly into the reaction zone at a plurality of reaction sites, the conversion of water to steam also serving to maintain the desired reaction temperature within the reaction zone.

10 Claims, 1 Drawing Figure

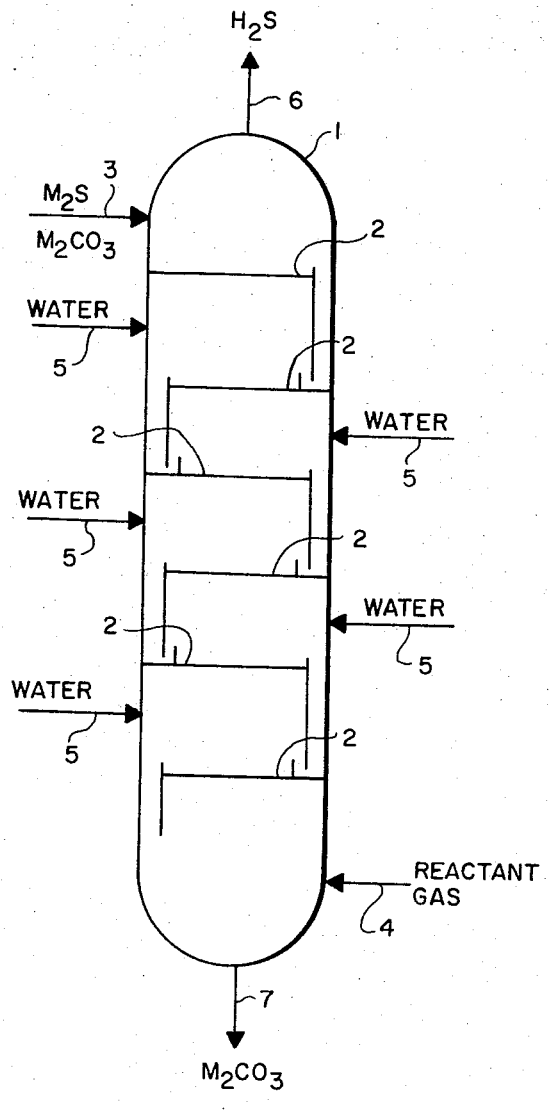

RECOVERY OF SULFUR VALUES FROM MOLTEN SALT

BACKGROUND OF THE INVENTION

This invention relates to the recovery of sulfur values as hydrogen sulfide from a molten salt containing alkali metal sulfides. It particularly relates to the recovery process shown in U.S. Pat. No. 3,574,545, and represents an improvement thereover.

Sulfur oxides, principally as sulfur dioxide, are present in the waste gases discharged from many metal refining and chemical plants and in the flue gases from power plants generating electricity by the combustion of fossil fuels. The control of air pollution resulting from this discharge of sulfur oxides into the atmosphere has become increasingly urgent. An additional incentive for the removal of sulfur oxides from waste gases is the recovery of sulfur values, otherwise lost by discharge to the atmosphere. However, particularly with respect to the flue gases from power plants, which based on the combustion of an average coal may contain as much as 3,000 ppm sulfur dioxide and 30 ppm sulfur trioxide by volume, the large volumes of these flue gases relative to the quantity of sulfur which they contain make removal or recovery of the sulfur compounds from these gases expensive. Also, while the possible byproducts, such as elemental sulfur and sulfuric acid, that may be ultimately obtained from the recoverable sulfur values have virtually unlimited markets as basic raw materials, they sell for relatively low figures. Consequently, low-cost recovery processes are required.

In the molten carbonate processes shown in U.S. Pat. Nos. 3,438,722; 3,438,727; and 3,438,728, sulfur oxide impurities are removed from a hot combustion gas by contacting it at a temperature of at least 350°C with a molten salt mixture containing alkali metal carbonates ($M_2CO_3$) as the active absorbent. The spent absorbent is then regenerated chemically and recirculated. In U.S. Pat. Nos. 3,574,543 and 3,574,545, twostage regeneration processes are shown in which alkali metal sulfites and sulfates present in a molten salt, generated by the foregoing molten carbonate absorption process, are converted in a reduction stage to alkali metal sulfides, which are then reacted in the molten salt with carbon dioxide and steam to form or regenerate the alkali metal carbonates and form hydrogen sulfide.

In this second stage of regeneration, it is considered essential from the point of view of process performance and economics that the reactants in the regenerator unit be maintained in the molten state at a temperature at least below 600°C. Such a lower temperature enables the use of relatively low cost, corrosion-resistant stainless steel equipment since alkali metal carbonate melt is very corrosive to stainless steels at temperatures above 600°C. More basically, the regeneration equilibrium of the following exemplary reaction:

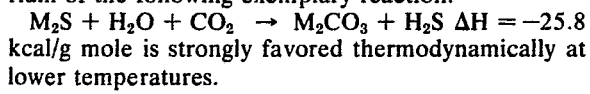

$$M_2S + H_2O + CO_2 \rightarrow M_2CO_3 + H_2S \quad \Delta H = -25.8$$

kcal/g mole is strongly favored thermodynamically at lower temperatures.

Precise control of temperature is difficult since the reaction shown is a highly exothermic one, the heat of regeneration raising the temperature of the melt. However, such careful control of the reaction temperature along the entire length of the regenerator reaction zone becomes essential for proper operation of the process to allow regeneration to proceed as well as to ensure optimum performance.

It has been suggested, where sieve bubble trays are used in the regenerator column, that several stages of external cooling be used for temperature control. Thus, liquid side streams would be tapped off from the column and separately cooled in heat exchangers. Such a technique requires maintaining a gas seal at the liquid-gas interface, and is compounded with associated additional costs as well as the difficulty of handling a molten salt at the desired temperature of operation.

Precise temperature control is also important since the solubility of sulfide in the melt decreases significantly with decreasing temperature. Thus at temperatures below 400°C, there is a tendency for the melt to become solid, depending upon the alkali metal cations present as well as the sulfide and carbonate concentrations.

The importance of maintaining temperature control in various chemical processes is well known. Guerrieri in U.S. Pat. No. 3,133,789 describes the conversion of a sodium sulfide-sodium carbonate smelt in a wood-pulping process. The smelt is reacted in a converter with carbon dioxide and water vapor to convert the sodium sulfide to sodium carbonate and $H_2S$. For effective operation, Guerrieri requires that his converter be maintained at a temperature above 851°C, the melting point of sodium carbonate, in order to avoid clogging of the reactor. In U.S. Pat. No. 3,401,010, Guerrieri mentions the use of steam for temperature control in a process for converting metal sulfates and sulfides to the corresponding metal carbonates. In his specific teaching, a sodium sulfide-sodium carbonate smelt from a pulp mill process is converted to sodium carbonate and $H_2S$. Guerrieri requires maintaining a minimum temperature of 650°C in the process shown. A heat-exchange zone is provided prior to the region where the chemical reaction occurs, the purpose of this zone being to temper the heat of combustion so that the hot gases do not melt the solid particulates that are being regenerated.

SUMMARY OF THE INVENTION

It is an object of the present invention to provide a highly efficient simplified method for recovering sulfur values from alkali metal sulfides in a molten salt while avoiding the use of expensive reactor vessels or auxiliary heat-exchange equipment.

It is known from U.S. Pat. No. 3,574,545 to treat an alkali metal sulfide-containing molten salt with a gaseous mixture containing steam and carbon dioxide in a reaction zone to reform or regenerate the alkali metal carbonate and at the same time form hydrogen sulfide gas. This hydrogen sulfide gas is a suitable feedstock for conversion to sulfur or sulfuric acid. It is an essential feature of the improvement provided by the present invention that water is controllably injected directly into the reaction zone at a plurality of spaced-apart reaction sites therein, so that the water is converted to steam to provide at least a major portion of the reactant steam required for the reaction that occurs in the reaction zone. At the same time, the conversion of water to steam serves to control the reaction temperature in the zone so as to maintain a selected reaction temperature below 600°C at which the salt is molten. By careful monitoring of the temperature for each of the spaced reaction sites, the injection of water to each of these sites may thereby be controlled so as to optimize the operating parameters of the regenerator with respect to the thermodynamic equilibrium, which is strongly favored by low temperatures; the highly exothermic heat of reaction, which requires removal from the system; and the solubility of sulfide in the melt, which decreases significantly with decreasing temperature.

The process is preferably performed at a temperature between 400° and 550°C, and particularly at a temperature between about 450° and 500°C. The reaction zone preferably consists of a series of vertically arranged bubble sieve trays, the sulfide-containing molten salt being passed in the molten state across the uppermost tray and then allowed to flow downwardly and across the remaining trays; the reactant gas, namely, carbon dioxide and steam is passed into the reaction zone from below the bottom tray and upwardly through bubble holes in the trays in countercurrent relation to the downwardly descending melt. The hydrogen sulfide gas formed is removed from the top of the regenerator vessel, and the regenerated alkali metal carbonate melt is removed from the bottom of the vessel.

BRIEF DESCRIPTION OF THE DRAWING

The sole FIGURE of the drawing shows a diagrammatic elevational view in section of a preferred embodiment of a regenerator vessel for the practice of the present invention.

DESCRIPTION OF THE PREFERRED EMBODIMENTS

The present invention is broadly directed to a process of treating a molten salt containing alkali metal sulfides at a selected temperature below 600°C to recover sulfur values therefrom as hydrogen sulfide. In its preferred embodiment, the present invention will be particularly described in relation to the process described in U.S. Pat. No. 3,574,545, and as an optimized improvement thereover. Thus, while not a part of the present invention, the molten carbonate absorption stage per se, shown in U.S. Pat. No. 3,438,722, and the two-stage reduction process, shown in U.S. Pat. Nos. 3,574,543 and 3,574,545, are incorporated herein by reference.

In the basic absorption reaction, a ternary mixture of the carbonates of lithium, sodium, and potassium, designated as $M_2CO_3$, is utilized as the active absorbent as well as the molten salt carrier solvent for the various stages of the process. Where the melt consists essentially of only the alkali metal carbonates, a ternary mixture consisting of potassium carbonate, lithium carbonate, and sodium carbonate is utilized having a melting point between 400° and 600°C. A mixture containing approximately equal amounts by weight of the carbonates of potassium, lithium, and sodium has a melting point of about 395°C, about that of the eutectic composition. Since the low melting region around the eutectic temperature is quite broad, a relatively large variation in composition (±5 mole percent) does not change the melting point markedly. Thus, a suitable ternary eutectic composition range, in mole percent, consists of 45 ± 5 lithium carbonate, 30 ± 5 sodium carbonate, and 25 ± 5 potassium carbonate.

Other nonreactive molten salts may be combined with the alkali metal carbonates to serve as inexpensive diluents or to lower the temperature. For example, a lithium-potassium salt mixture containing chloride, sulfite, and carbonate is molten at a temperature of 325°C. Where such diluent salts are utilized, either a single alkali metal carbonate or a binary or ternary mixture of the alkali metal carbonates is combined therewith, the final mixture containing two or more alkali metal cations. In such a system as little as 2 mole percent of alkali metal carbonate may be present with the remaining 98 mole percent being an inert diluent carrier, although at least 5-10 mole percent of alkali metal carbonate is preferable. Illustrative of such a suitable mixture is one utilizing a LiCl-KCl eutectic (M. P. 358°C) wherein the starting salt ratio consists of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonates has a melting point of about 375°C. Suitable chloride-carbonate molten salt mixtures contain, in mole percent, 15-60 $K^+$, 40-85 $Li^+$, and 0-20 $Na^+$ as cations and 10-98 $Cl^-$ and 2-90 $CO_3^=$ as anions.

Although the melting points of the pure alkali metal sulfites and sulfides are considerably higher than those of the mixed alkali metal carbonates, where sulfite or sulfide is substituted for only a portion of the carbonate the melting point is lowered. Thereby the circulation of sulfide-containing carbonate melt is readily feasible without the need for additional heat input to keep the circulated salt molten, which would be required were sulfide alone being circulated.

Following the absorption reaction, the formed alkali metal sulfates and sulfites present in the excess carrier carbonate are converted to alkali metal sulfides. Such a conversion may conveniently be accomplished by utilizing a carbonaceous material such as a petroleum coke or the like as the reducing agent. The resultant molten mixture of alkali metal sulfide and alkali metal carbonate, with possibly some unreacted sulfite and sulfate present, constitutes the feedstock to the preferred embodiment of the present process.

Referring to the drawing, a regenerator vessel 1 is shown containing a plurality of spaced-apart sieve bubble trays 2. An exemplary regenerator unit for use in the practice of this invention is approximately 50 ft in height and 1½ feet in diameter and contains about 15 sieve bubble trays to give seven theoretical plates, based on an estimated efficiency of about 50 percent. The carbonate-sulfide melt at a temperature of about 450°C and a flow rate of about 2 gallons/min is directed by way of conduit 3 so as to be fed onto the uppermost sieve bubble tray. Suitable sieve bubble trays have perforations therein varying from about 5 to 25 millimeters in diameter.

In general, the maximum hydrogen sulfide concentration achievable in the regenerator off-gas is for all practical purposes independent of the $M_2S$ concentration in the carbonate feed melt. As a result of solubility limitations, the operating temperature of the regenerator is determined in part by the $M_2S$ concentration in the carbonate feed melt. This melt may contain from 10 to 35 mole percent of sulfide, with 15-30 mole percent being preferred.

For optimized reaction, conversion efficiencies of $M_2S$ to $H_2S$ of 95 mole percent are feasible. The regeneration equilibrium is strongly favored by a high steam concentration in the feed gas, and to a lesser extent by increased total pressure or $CO_2$ concentration, especially at lower temperatures or higher $CO_2$ concentrations. At a given steam concentration, the effect of $CO_2$ concentration is more important than that of total pressure. A stoichiometry limitation combined with equilibrium considerations makes it preferable that the regeneration gas have as high a concentration as possible of $CO_2$ and steam. This requirement can be adequately satisfied through the use of a reducer off-gas from a fluid coke reduction system, the gas containing about 40 mole percent $CO_2$. At atmospheric pressure, a reactant gas that contains about 25 mole percent $CO_2$ and 25 mole percent steam allows the production of an off-gas from the regenerator containing a maximum of about 10 mole percent $H_2S$. With the addition of more steam, particularly as utilized in the present process where the steam is formed from the water injected into the reaction region at the plurality of reaction sites, the water vapor content of the gas is increased to about 40 mole percent, with the $CO_2$ content being concurrently reduced to about 20 mole percent. Thereby the achievable $H_2S$ concentration in the product gas is increased to about 15 mole percent. Nitrogen will also generally be present in the reactant gas fed to the regenerator and in the product gas from the system.

Referring again to the drawing, the reactant gas is admitted to the bottom of vessel 1 by way of a conduit 4 and is fed at a rate of about 150 std. cu ft/min into the regenerator vessel at a point below the bottommost bubble sieve tray. Thereby the flow of the reactant gas is in countercurrent relation to the downward flow of the sulfide-containing carbonate melt. The reactant gas is suitably fed to the regenerator at a temperature between 400° and 500°C.

Various thermocouples, not shown, connected to suitable control instruments, are utilized at each of the bubble tray sites in the reactor region so as to measure and monitor the temperature within each zone. While some steam is preferably initially admitted as part of the reactant gas, the major portion of the steam required for the regeneration reaction is provided by the water injected into each of the reaction sites by way of a plurality of conduits 5. The water is injected at room or ambient temperature from suitable water-cooled nozzles, at a pressure of generally about 1000 psi and a flow rate of about 0.25 gallons/min, although the pressure and the flow rate are not critical and the water may be heated or cooled where required. The water entering the bubble tray regions is immediately vaporized to steam and intermingles with the upwardly moving reactant gas which reacts with the downwardly moving sulfide-containing carbonate melt at the tray reaction sites. At the same time, because of the latent heat of vaporization involved, the conversion of the water to steam serves to remove heat from the reaction sites within the regenerator vessel. Since the control of the water flow through each of the individual conduits 5 is separately monitored, and is regulated by the thermocouple measuring devices and associated recording and control instrumentation, means are thereby provided for controlling the temperature within the exothermic reaction zone within the selected limits between 400° and 600°C depending upon other process parameters. Because the temperature-monitoring and controlling thermocouples enable automatic adjustment to be made of the water injected into each of the separate sieve bubble tray regions, uniform and careful control of temperature is feasible along the entire length of the regenerator vessel.

The formed $H_2S$ gas is recovered by way of a conduit 6 at the top of the regenerator. This gas is separately stored or may be directly led to a Claus plant for conversion to sulfur. The regenerated molten carbonate is removed from the bottom of vessel 1 by way of a conduit 7, generally for recirculation in the closed-cycle molten carbonate process.

It will of course be realized that many variations in reaction conditions may be used in the practice of this invention to obtain optimization of the operating parameters in the regenerator with respect to the interrelationship of temperature, sulfide concentration, carbonate melt composition and concentration, and reactant gas composition. Thus while an exemplary reaction has been described for the regeneration process of the present invention, it has been found that the actual mechanism of reaction is a highly complex one and several competing reactions may occur simultaneously. However, even where the desired reactions do not go to completion, and products are also present that are produced by competing or undesired side reactions, these unreacted or undesired products may be recycled in the process without substantial interference therewith. Thus it will be realized that to obtain greater liquid and gas flow throughput in the regenerator unit than illustrated, the regenerator unit will have a correspondingly greater diameter for a given height and number of trays. Accordingly, while this invention has been described with respect to specific concentrations, temperatures, flow rates, and other reaction conditions, the invention may be otherwise practiced by those skilled in the art without departing from the spirit and scope thereof which should be determined in accordance with the claims present herein.

I claim:

1. In a process for recovering sulfur values as hydrogen sulfide gas from alkali metal sulfides as reactive material contained in an inorganic molten salt in a reaction zone, wherein said molten salt is contacted with a gaseous mixture containing carbon dioxide and steam at a selected reaction temperature below 600°C at which the alkali metal sulfide-containing salt is molten to form alkali metal carbonates in said molten salt and hydrogen sulfide gas as a recoverable product, the improvement which comprises injecting water directly into said reaction zone at a plurality of reaction sites therein, said water being converted to steam to provide at least a portion of the reactant steam for the reaction in said zone while at the same time maintaining the reaction temperature in said zone at said selected temperature.

2. The process according to claim 1 wherein the reaction is performed at a selected temperature between about 400° and 550°C.

3. The process according to claim 1 wherein the reaction is performed at a selected temperature between about 450° and 500°C.

4. The process according to claim 1 wherein said molten salt prior to reaction with said gaseous mixture consists essentially of a molten mixture of the sulfides and carbonates of lithium, sodium, and potassium.

5. The process according to claim 1 wherein said molten salt is passed downwardly in countercurrent relation to said gaseous mixture flowing upwardly.

6. The process according to claim 5 wherein each of said reaction sites comprises a sieve bubble tray, the water being injected separately at each said reaction sites.

7. The process according to claim 1 wherein a major portion of the steam required for the regeneration reaction is provided by the water injected into said reaction zone at said plurality of reaction sites therein.

8. The process according to claim 7 wherein each of said reaction sites comprises a sieve bubble tray, the water being injected separately at each of said reaction sites.

9. The process according to claim 8 wherein said molten salt prior to reaction with said gaseous mixture consists essentially of a molten mixture of sulfides and carbonates of lithium, sodium and potassium.

10. The process according to claim 9 wherein the reaction is performed at a selected temperature between about 400° and 550°C.

* * * * *